United States Patent
Schroeder

(10) Patent No.: US 9,344,771 B2
(45) Date of Patent: May 17, 2016

(54) SYSTEMS AND METHODS FOR DELIVERING NETWORK CONTENT VIA AN AUDIO-VISUAL RECEIVER

(71) Applicant: ECHOSTAR TECHNOLOGIES L.L.C., Englewood, CO (US)

(72) Inventor: Kyle Schroeder, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 121 days.

(21) Appl. No.: 14/140,886

(22) Filed: Dec. 26, 2013

(65) Prior Publication Data

US 2014/0181883 A1    Jun. 26, 2014

Related U.S. Application Data

(60) Provisional application No. 61/745,943, filed on Dec. 26, 2012.

(51) Int. Cl.
| | |
|---|---|
| *H04W 4/00* | (2009.01) |
| *H04L 12/28* | (2006.01) |
| *H04J 3/22* | (2006.01) |
| *H04N 21/61* | (2011.01) |
| *H04N 21/438* | (2011.01) |
| *H04N 21/436* | (2011.01) |

(52) U.S. Cl.
CPC ......... *H04N 21/6168* (2013.01); *H04N 21/436* (2013.01); *H04N 21/438* (2013.01)

(58) Field of Classification Search
CPC ............. H04N 21/435–21/436; H04N 21/438; H04N 21/2343; H04N 21/2365; H04N 21/6118; H04N 21/6125; H04N 21/6168; H04N 21/6175; H04N 21/23614; H04N 21/43615; H04N 21/43637
USPC ................. 370/315–316, 328, 338, 400–401, 370/535–545, 464–466; 398/66–71
See application file for complete search history.

(56) References Cited

U.S. PATENT DOCUMENTS

| | | | |
|---|---|---|---|
| 8,553,882 B2* | 10/2013 | Cholas et al. ................. 380/210 |
| 8,705,417 B2* | 4/2014 | Wall et al. ..................... 370/297 |
| 2008/0002709 A1* | 1/2008 | Kennedy ............. H04L 12/2856 370/395.1 |
| 2009/0180782 A1* | 7/2009 | Bernard et al. ............... 398/140 |
| 2010/0238932 A1* | 9/2010 | Kliger ................. H04L 12/4633 370/392 |
| 2010/0325670 A1* | 12/2010 | Strong .................... H04H 20/63 725/71 |
| 2011/0274156 A1* | 11/2011 | Mighani ............ H04N 21/2381 375/240.02 |
| 2012/0297426 A1* | 11/2012 | Ling et al. ....................... 725/68 |
| 2013/0067509 A1* | 3/2013 | Talbert ............. H04N 21/43615 725/31 |
| 2013/0133012 A1* | 5/2013 | Ling et al. ....................... 725/68 |
| 2015/0106447 A1* | 4/2015 | Hague ........................... 709/204 |

* cited by examiner

*Primary Examiner* — Tri H Phan
(74) *Attorney, Agent, or Firm* — Ingrassia Fisher & Lorenz, P.C.

(57) ABSTRACT

An audio/visual (A/V) transceiver is provided for supplying intent access to a computing device. The A/V receiver comprises a first format module configured to receive and process electronic data in a first format and an Ethernet module configured to transmit electronic data to the computing device in Ethernet format via an Ethernet port. The transceiver further comprises a bridging application executing on a processor, the bridging application configured to convert internet data in the first format into the Ethernet format. A method is also provided for supplying internet access to a computing device over an audio/visual (A/V) receiver. The method comprises receiving an internet signal in a first protocol standard at an A/V receiver, bridging the internet signal in the first protocol standard into a second protocol standard understood by the computing device, and transmitting the internet signal in the second protocol standard to the computing device.

18 Claims, 4 Drawing Sheets

SYSTEMS AND METHODS FOR DELIVERING NETWORK CONTENT VIA AN AUDIO-VISUAL RECEIVER

PRIORITY CLAIM

This application claims priority to U.S. Provisional Patent Application Ser. No. 61/745,943 filed on Dec. 26, 2012.

TECHNICAL FIELD

The present invention generally relates to providing access to a network, and more particularly relates to systems and methods for providing access to a local area or other network via an audiovisual receiver.

BACKGROUND

Most internet or other wide-area-network (WAN) users receive their internet services via a cable, digital service line (DSL), telephone, satellite or other broadband-type connection. This connection is typically provided by a service provider to a modem located in the user's home, business or other premises. The modem's connection to the wide area network is commonly shared between multiple devices located within the premises through a wireless or hard-wired network, such as a Wi-Fi, Ethernet or other local area network (LAN). To that end, the modem typically communicates with one or more gateways, routers, hubs, repeaters and/or other devices that permit sharing of the WAN connection. A Wi-Fi or similar gateway, for example, broadcasts wireless internet signals throughout the user's location; alternately or additionally, a wired Ethernet connection could facilitate communications between the modem or router and the end user.

For some users, television and broadband network connections are received from the same cable, telephone or satellite provider. Even though television and broadband signals may be delivered to the home via a common wire, however, television and network signals are typically distributed separately from each other throughout the home. Television signals, for example, are typically first received and distributed throughout the home at a set top box (STB), outdoor unit (ODU) or the like rather than at the modem that typically receives broadband network signals.

Often, challenges arise in delivering network access to devices located throughout the home. Various desirable features and characteristics will become apparent from the subsequent detailed description and the appended claims, taken in conjunction with the accompanying drawings and this background section.

BRIEF SUMMARY

Various systems, methods and devices described below provide Ethernet, Wi-Fi, TCP/IP or other network service across a MoCA or similar cable connection that is typically used for delivering television signals. Network signals can be encapsulated within MoCA or similar frames, for example, so that network traffic can be bridged, routed or otherwise provided from a LAN associated with a transmitting receiver to a new LAN associated with the receiving A/V receiver. A STB acting as a home media gateway on a wired or wireless network, for example, could encapsulate Ethernet or Wi-Fi traffic into MoCA frames that are transmitted over a coaxial wire to another receiver that ordinarily processes television programming. The receiving receiver, in turn, re-transmits the received network traffic via its network interface, thereby creating a bridge to a new LAN. This new LAN, in turn, can provide extended wired or wireless network access to devices in closer proximity to the television receiver that receives the encapsulated signals. Return traffic to can be processed in a similar manner, with network traffic encapsulated into a MoCA or similar format for transmission across the coaxial television connection to a television receiver on the opposite side of the bridged network.

Some embodiments provide a method executable by a television or other audio/visual (A/V) receiver to supply network access via a cable television connection. The method suitably comprises receiving a network signal according to a first format at the A/V receiver, wherein the network signal is received from a local area network; encapsulating the network signal in the first protocol standard into a second format different from the first format that is transmittable on the cable television connection; and transmitting the encapsulated network signal in the second format to a second A/V receiver that extracts the encapsulated network signal from the second format and re-transmits the network signal in the first format via a network interface of the second A/V receiver.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary television receiver system;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, efficient network service distribution may be accomplished by utilizing unused Ethernet capabilities of television or other audio/visual (A/V) receivers that are already in place, thereby eliminating the need for running Ethernet cable between rooms or buying additional wireless modems. Many set top boxes (STBs), television receivers and the like are now able to communicate as clients on a wired or wireless local area network (LAN), such as an Ethernet or Wi-Fi LAN. To that end, many such devices incorporate hardware interfaces to Ethernet, Wi-Fi and/or other types of LANs. While these interfaces were traditionally used to establish the device as a client on the network, the same interface could alternately be used to provide network access to a new wired or wireless LAN, thereby allowing other devices in the proximity of the television receiver to obtain network service when such service would otherwise be inconvenient, if not unavailable.

The television receiver therefore acts as a network bridge, router, gateway or the like by encapsulating and/or translating network traffic from the new LAN so that it can be transmitted over a MoCA or similar connection typically used for distributing television signals throughout the premises. The television receiver could encapsulate TCP/IP or other network traffic on the LAN into MoCA packets, for example, that could be routed over a coaxial or other television cable for retransmission, forwarding or other actions as appropriate.

Figure 1:
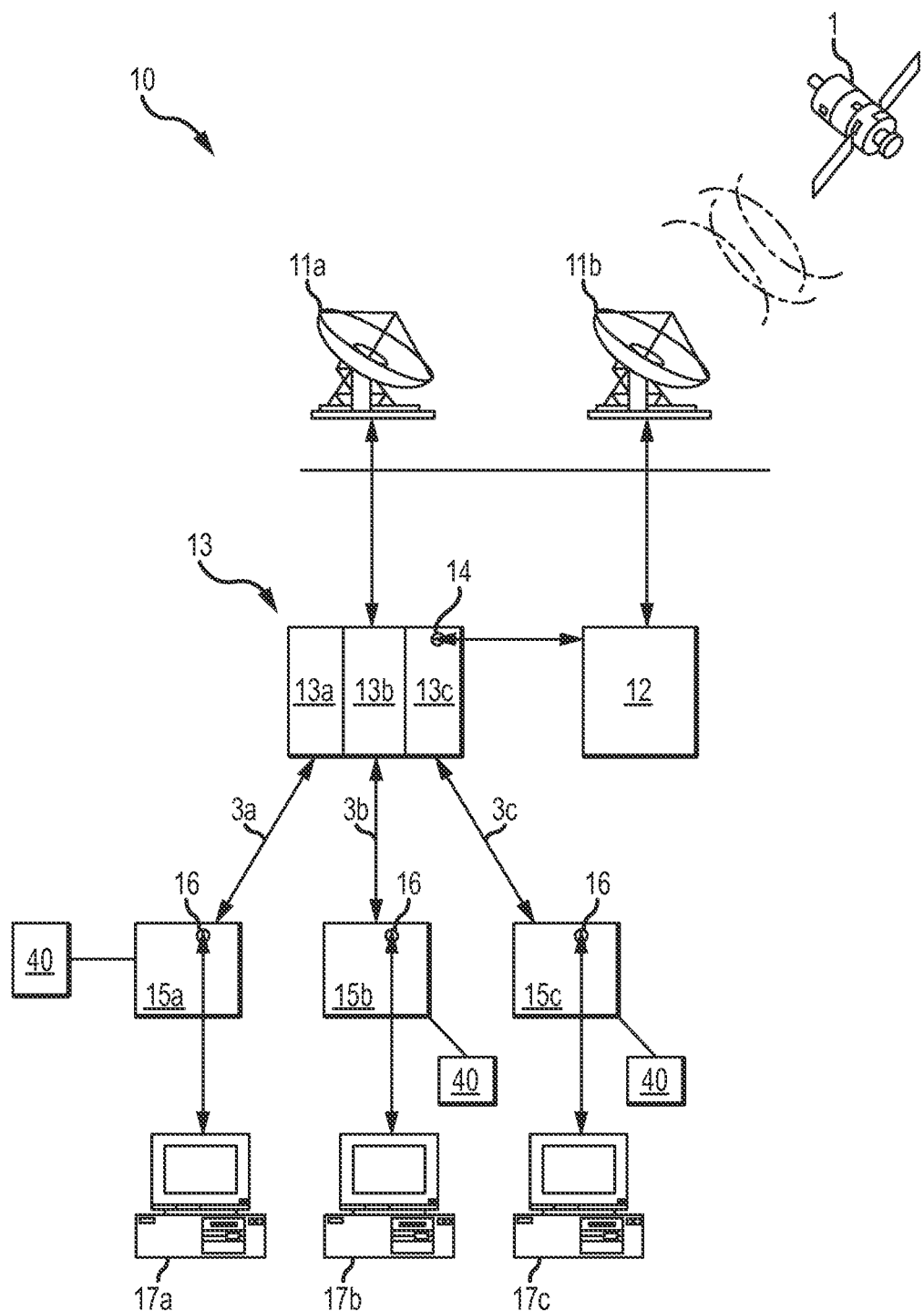

FIG. 1 presents an exemplary server/client system that may be modified to provide internet services throughout a location. FIG. 1 shows internet access provided by a satellite 1 that is broadcasting to an internet antenna 11b. However, the manner of sourcing the internet is not a pertinent part of the novel subject matter provided herein. Internet access by the modem 12 may be via a Data Subscription Line (DSL) or cable just as well as via satellite broadcast. Further, "internet" access could equivalently refer to any public or private wide area network, such as a telephone network, a private intranet, or any other network based upon TCP/IP or other protocols, as desired.

The system of FIG. 1 includes a television receiver 13 (e.g., a set top box), which receives and decodes broadcast television signals. FIG. 1 shows receiver 13 receiving television signals from the satellite 1 via dedicated A/V antenna 11a; equivalent embodiments could receive television signals via coaxial cable, digital subscriber line (DSL), or any other wired or wireless media. The receiver 13 illustrated in FIG. 1 comprises three separate tuners 13A-C to allow A/V signals to be de-multiplexed into three separate channels 3a-c communicating with three separate A/V receivers 15A-C wirelessly or via cable. A specific non-limiting example of a suitable receiver 13 may be known in the art by the trade name Hopper® sold by Echostar Corporation of Englewood, Colo. A specific non-limiting example of a suitable A/V receiver 15A-C may be known in the art by the trade name Joey®, also sold by Echostar, although many other different products or devices could be equivalently used. A specific, non-limiting example of a home entertainment networking protocol is that established protocol approved by the Multimedia over Coax Alliance (MoCA®). The satellite receiver 13 in this instance may have an RG6 port for both input and output, with this port using bandstacking to three internal satellite tuners and MoCA technology to provide HD feeds to up to 3 "Joey" transceivers across the same RG6 cable that comes in. Equivalent embodiments could be implemented using cable television STBs, other brands or models of DBS STBs, or other television receiver components as desired. Such components may provide any number of television signals to any number of remote stations using any type of wired or wireless television distribution channels.

Figure 2:
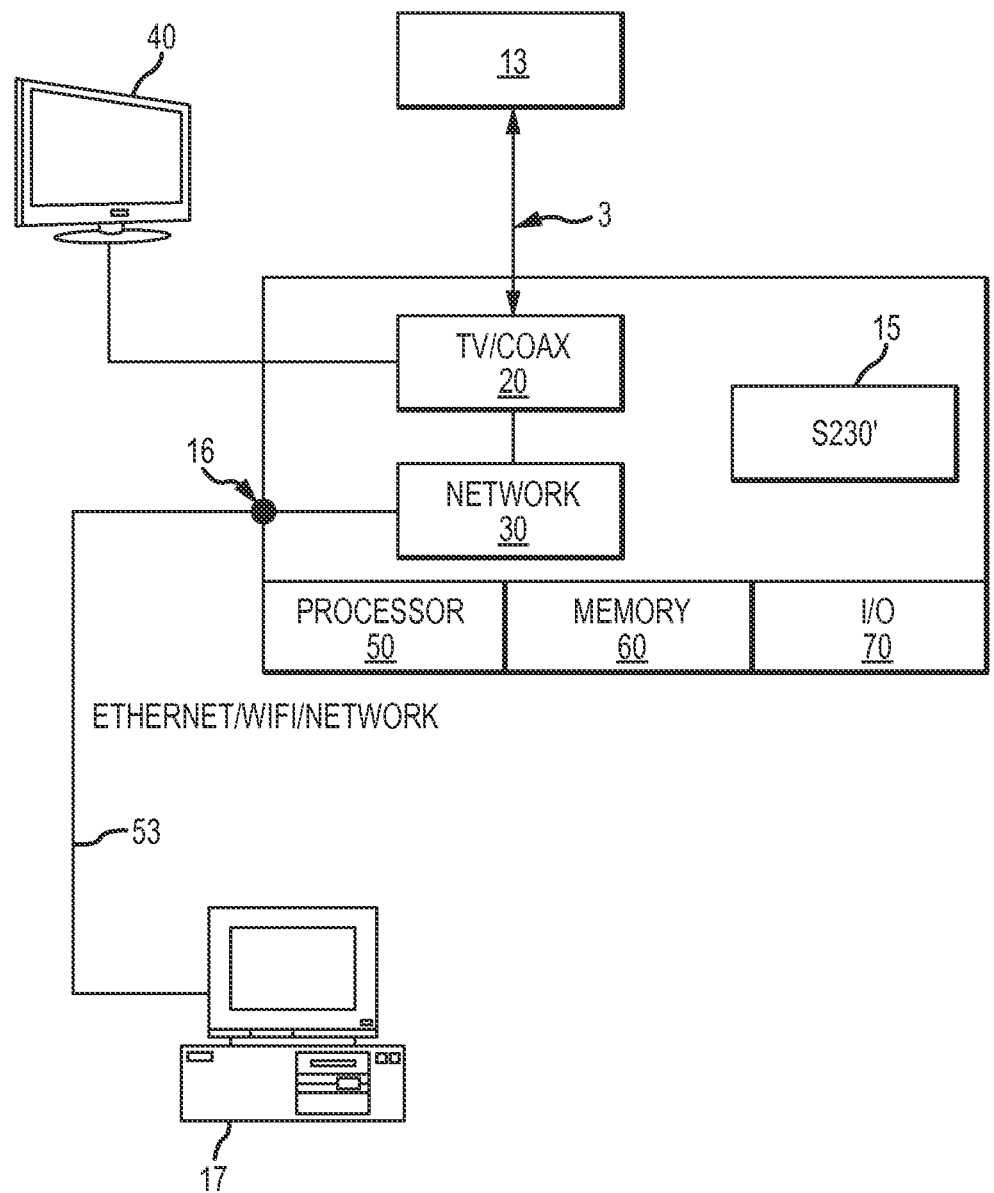
FIG. 2 is a block diagram of an exemplary television receiver device.

FIG. 2 is a functional block diagram of an exemplary, non-limiting A/V receiver 15 of a suitable type contemplated herein. Among other components, the A/V receiver 15 includes an Ethernet, WiFi or other network port 16, a MoCA or other cable bridge 20, a network bridge 30, a television 40, a processor 50, a memory 60, and an input/output (I/O) module 70. Network port(s) 16 may provide physical connection between an A/V receiver 15a-c and a user computing device 17a-c, either directly via cable or wirelessly. The MoCA® bridge 20 may be a standalone device or may be integrated within the A/V transceiver 15.

The A/V receiver 15 of FIG. 1 includes a MoCA® application that contains instructions allowing the A/V receiver 15 to receive, translate, encapsulate and/or process data according to the MoCA® protocol. The A/V receiver 15 also includes an Ethernet module or card 30 that is configured to receive, translate and process data pursuant to the Ethernet protocol or the like. Although this discussion of the FIG. 1 embodiment uses MoCA and Ethernet as an example, equivalent embodiments could operate with wireless (e.g., WiFi) or other networking protocols and/or different television/cable protocols other than MoCA, A/V receiver 15 includes a bridging application S230 that is run by the processor 50 and that operates the A/V receiver 13 to receive and provide audio/visual signals to a television 40. To handle the conversion of network data transmission between the MoCA®/coaxial protocol and the network protocol and thereby utilize network port 16, S230 application may be augmented or modified to handle such bridging functions. The modified bridging application is referred to hereinafter as S230'.

Figure 3:
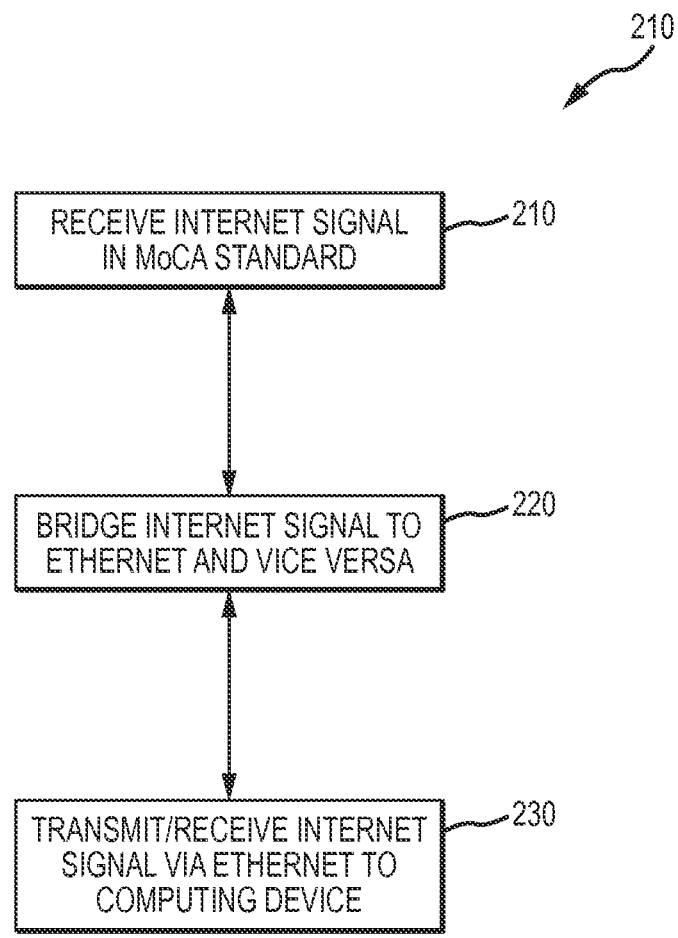
FIGS. 3 is a functional block diagram of a method for providing network access via an audio-visual transceiver.

FIG. 3 is a functional flow chart of an exemplary method for providing network access via a television or other A/V receiver 15. The method begins at process 210 where the A/V receiver 15 receives an network signal from the receiver 13 in MoCA home entertainment networking standard, which is the same standard in which the A/V data is received for television viewing. That is, the MoCA connection is used to transfer both television content and network data to receiver 15; the MoCA connection may also carry return network data to receiver 13, along with any control signals or the like issued by receiver 13 to receiver 15. At process 220, the modified bridging application S230' de-encapsulates or otherwise translates the network signal from the MoCA standard to into the conventional network standard (e.g, Ethernet, WiFi, etc.). At process 230, the extracted network signal is then re-transmitted on the wired or wireless network 53 to the users computing device 17. In various embodiments, Ethernet, Wi-Fi, TCP/IP or other network packets are simply encapsulated within MoCA headers (or the like) so that network packets received by A/V receiver 15 are simply passed as MoCA traffic to receiver 13. Receiver 13 then extracts the encapsulated network packet from the MoCA frame and re-transmits the extracted network packet on its own LAN. A/V receiver 15 similarly encapsulates some or all of the packets on its own LAN into MoCA frames for transmission to receiver 13, which similarly re-transmits the extracted network data on its own LAN. The MoCA connection may therefore be used to provide a bridge between the LAN coupled to receiver 13 and the LAN coupled to A/V receiver 15.

In some implementations, receivers 13 and/or 15 could additionally provide routing or gateway functions, as appropriate. To that end, receivers 13, 15 could select only some of the network traffic for encapsulating and bridging over the MoCA connection. Network traffic that is selected for routing across the MoCA connection could include, for example, only traffic intended for devices on the other side of the MoCA bridge, only traffic that conforms to certain protocols, only traffic intended for eventual routing to the WAN, or any other traffic as desired. Receivers 13 and/or 15 could also act as gateways by providing protocol conversions, address translation and/or other functions on the network traffic itself. Other embodiments could include additional or alternate features as desired.

Figure 4:
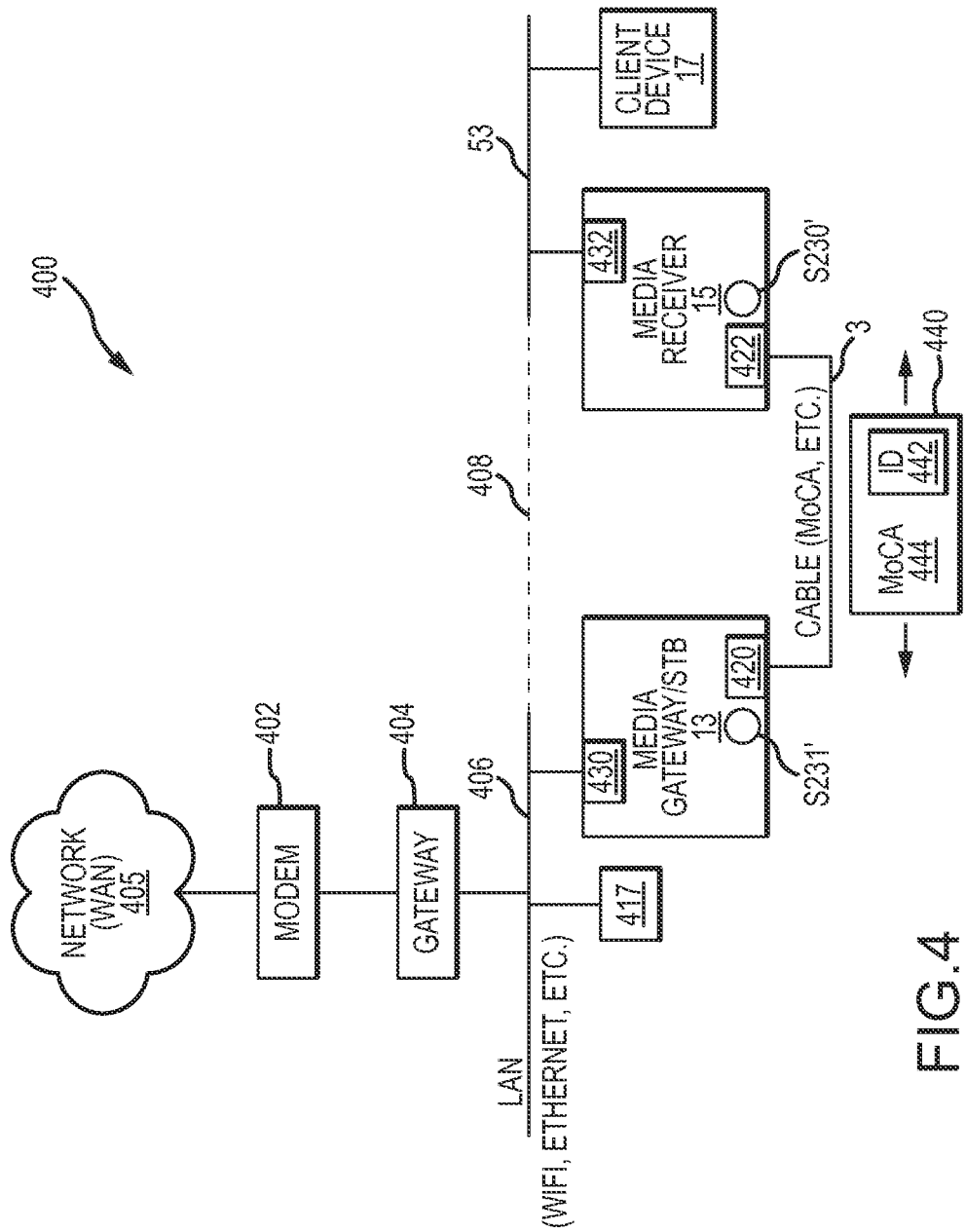
FIG. 4 is a diagram of an exemplary system for bridging local area networks over a coaxial cable.

FIG. 4 is a diagram of an exemplary system 400 in which a MoCA or other coaxial cable connection 3 is used to create a virtual bridge 408 between two local area networks 406, 53. This virtual bridge 408 could be used, for example, to facilitate connections from a client device 17 to network 406 and/or WAN 405, as desired. Note that the coaxial connection 3 is typically used to transport television signals that are received and decoded by receiver 13 to receiver 15 for presentation on a television or other display attached to receiver 15. These television signals are typically transported within MoCA or similar frames. To that end, cable connection 3 can be used to provide simultaneous transport of television and encapsulated network data within a common MoCA or similar framework. That is, MoCA constructs (or the like) can support simultaneous transmission of television and encapsulated network traffic on cable connection 3, as desired.

As noted above, most users connect to the Internet or another WAN via a modem 402. Typically, an Ethernet hub, router, WiFi gateway or other device 404 allows the WAN connection to be shared between multiple devices executing within a home, business or other premises. Typically, device 404 creates a wired or wireless LAN 406 that can be shared between various devices 13, 417 and the like.

Often, however, LAN 406 may not extend far enough to connect all of the devices on the premises. This may be due to unavailability of wiring in the case of a wired Ethernet LAN, or the physical distance between devices may be too great for effective wireless communications. The MoCA (or other coaxial) connections between television receivers can therefore be used to extend network communications to devices 17 that would otherwise lack convenient network access. Devices 17 could include, for example, media players, disk players, video game consoles, televisions and/or other components that are frequently located in the same cabinet, entertainment center, or other environment as media receiver 15. In various embodiments, the LAN interface 432 could be connected to an Ethernet hub or the like so that multiple devices could share the service provided by interface 432. In other embodiments, device 17 could provide an effective wireless repeater or the like to extend the range of a wireless network 406. Various embodiments could provide additional or alternate features in many different types of network environments, as appropriate.

Addressing can be handled in any manner. In various embodiments, receiver 13 assigns MoCA addresses for the various receivers 13, 15 communicating on coaxial connection 3. Typically, addresses on network 406 are assigned by router/gateway device 404. In embodiments that encapsulate network traffic 442 into MoCA packets 444 for bridging or other transport over cable 3, the network 53 formed by the receiving device 15 could be considered to be a continuation of network 406. Address requests from devices 17 on network 53 may therefore be encapsulated and transported over connection 3 to device 404 in such embodiments; device 404 would respond to the address request from device 17 as if the request emanated from a device (e.g., device 417) on network 406. This effectively creates a single virtual LAN 408 that incorporates the two LANs 406, 53 into a common address space, as appropriate. Other embodiments could provide a routing or gateway feature at receiver 15 (and/or receiver 13) to issue addresses on LAN 53 and/or to selectively route traffic between LANs 53 and 406, as desired.

In operation, then, each media receiver 13 and/or 15 is able to receive network packets 442 in TCP/IP or another format at its network interface and to encapsulate the received network packet into a MoCA or similar format 444 for transmission via the receiver's coaxial interface. Each receiver is also able to receive encapsulated packets 444 via its coaxial interface from the other receiver(s), and to extract the encapsulated network content 442 for re-transmission via the receiver's network interface. Receiver 13, for example, suitably receives network traffic 442 from LAN 406 at network interface 430, encapsulates the received data 442 into MoCA frames 444 or the like, and retransmits the MoCA data on connection 3. Receiver 13 also receives encapsulated network traffic 442 from receiver 15 via connection 3 and extracts the encapsulated traffic 442 for re-transmission on network 406. Receiver 15 similarly receives network traffic 442 on LAN 53 and encapsulates it in MoCA frames 444 for transmission via connection 3 to receiver 13. Encapsulated traffic 442 received at receiver 15 from receiver 13 is extracted and re-transmitted on LAN 53 via network interface 432, as appropriate. These functions may be carried out by software S230' in either receiver 13 and/or 15; software S230' may additionally or alternately perform protocol conversion, routing, packet modifications or other functions as desired.

As described herein, then, set top boxes, television receivers or the like can be used to expand home network capabilities by bridging Ethernet, WiFi or other network traffic across MoCA or other television connections. This allows the Ethernet, WiFi and/or other network capabilities of the receiver to be repurposed or expanded, as appropriate, to act as a network bridge, router or gateway rather than simply as a client to a network hosted by another device.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method executable by an audio/visual (A/V) receiver to supply network access via a cable television connection, the method comprising:
   receiving a network signal according to a local area network format at the A/V receiver, wherein the network signal is received from a local area network;
   encapsulating the network signal in the local area network format into a Multimedia over Coax Alliance MoCA format different from the local area network format that is transmittable on the cable television connection; and
   transmitting the encapsulated network signal in the MoCA format to a second A/V receiver that extracts the encapsulated network signal from the MoCA format and re-transmits the network signal in the local area network format via a network interface of the second A/V receiver.

2. The method of claim 1 further comprising:
   receiving second network signals from the second A/V receiver via the cable television connection, wherein the second network signals are received in the Ethernet format encapsulated in the second MoCA format;
   extracting the second network signals in the Ethernet format from the MoCA format; and
   re-transmitting the second network signals in the local area network format.

3. The method of claim 1 wherein the local area network format is Ethernet.

4. The method of claim 1 wherein the encapsulating and transmitting bridges network traffic between the local area network and a new local area network associated with the second A/V receiver.

5. The method of claim 1 wherein the local area network format is Wi-Fi.

6. The method of claim 1 wherein the local area network format is TCP/IP.

7. The method of claim 1 wherein the cable television connection is a coaxial cable.

8. The method of claim 7 further comprising receiving, by the A/V receiver, television signals, and transmitting the received television signals to the second A/V receiver via the coaxial cable so that the coaxial cable simultaneously transmits received television signals and encapsulated network signals to the second A/V receiver.

9. A system to provide bridged network access to a device via a cable television connection, the system comprising:
   a first television receiver having a first network interface configured to communicate with a local area network, a first cable interface configured to communicate with the cable television connection, and a processor configured to receive network traffic in a local area network format via the first network interface, to encapsulate the network traffic in the local area network format in a Multimedia over Coax Alliance MoCA format that is transmittable on the cable television connection, and to transmit the network traffic encapsulated in the MoCA format on the cable television connection; and
   a second television receiver having a second network interface configured to communicate with a second local area network, a second cable interface configured to communicate with the cable television connection, and a processor configured to receive the network traffic encapsulated in the MoCA format from the first television receiver via the cable television connection, to extract the network traffic in the local area network format, and to transmit the network traffic in the local area network format on the second local area network via the second network interface to thereby bridge the network traffic between the local area network and the second local area network.

10. The system of claim 9 wherein the cable television connection is a coaxial cable.

11. The system of claim 10 wherein the first television receiver also receives television broadcast signals and transmits at least some of the received television broadcast signals to the second television receiver via the coaxial cable.

12. The system of claim 11 wherein the coaxial cable simultaneously transmits both the received television broadcast signals and the encapsulated network signals to the second television receiver.

13. The system of claim 9 wherein the cable television connection is a coaxial cable, and wherein the second network interface is an ETHERNET interface.

14. The system of claim 9 wherein the cable television connection is a coaxial cable and wherein the second network interface is a Wi-Fi interface.

15. The system of claim 14 wherein the second Wi-Fi interface broadcasts traffic from the first local area network that is received via the coaxial cable to thereby provide a Wi-Fi repeater.

16. A television receiver for providing internet access to a computing device, the television receiver comprising:
    a television data interface configured to receive and process signals received via a television connection;
    a processor;
    an network interface configured to transmit electronic data to the computing device in a local area network format; and
    a bridging application executing on the processor, the bridging application configured to convert at least some of the signals received via the television connection from a Multimedia over Coax Alliance MoCA format to thereby extract network traffic in the local area network format and to transmit the extracted local area network traffic in the local area networking format to the computing device via the network interface.

17. The television receiver of claim 16 wherein the MoCA format is a Multimedia over Coax Alliance (MoCA®) standard format, and wherein the local area network format is an ETHERNET format.

18. The television receiver of claim 16 wherein the MoCA format is a Multimedia over Coax Alliance (MoCA®) standard format, and wherein the network module is a Wi-Fi transceiver.

* * * * *